United States Patent Office 3,321,546
Patented May 23, 1967

3,321,546
OLEFIN DIMERIZATION USING ALUMINUM ALKYL HALIDE-NICKEL COMPLEX CATALYST
Bernard C. Roest and Ernst L. Th. M. Spitzer, Amsterdam, Netherlands, assignors to Shell Oil Company, New York, N.Y., a corporation of Delaware
No Drawing. Filed Nov. 26, 1963, Ser. No. 326,241
Claims priority, application Netherlands, Nov. 30, 1962, 286,211
17 Claims. (Cl. 260—683.15)

This invention relates to the dimerization of olefinic hydrocarbons consisting essentially of alpha-monoolefins. The invention relates more particularly to the catalytic dimerization of monoolefinic hydrocarbons comprising ethylene and/or propylene in the presence of an improved nickel-containing complex catalyst composition.

The dimers of mono-olefinic hydrocarbons, particularly of the alpha olefins, such as, for example, propylene and ethylene dimers are of value in a wide field of applications. They constitute an important starting material in polymer chemistry. The dimers of propylene can be pyrolytically converted to isoprene and dehydrogenated to methylpentadiene, both products being attractive monomers for the manufacture of rubber-like polymers.

The usefulness of the alpha-olefin dimers has inspired the development of processes directed to their large-scale production. However, practical scale utilization of catalytic processes disclosed heretofore are often handicapped by serious disadvantages unavoidably inherent therein which militate against efficient utilization. Certain of these processes rely upon the use of aluminum alkyls, either alone or in combination with "colloidal nickel." The relatively large amounts of highly reactive aluminum alkyls called for and the relatively high temperatures and pressures of necessity required therewith often present drawbacks to their use in practical-scale operation. Processes have been developed wherein catalysts consisting of certain nickel salts of organic or inorganic acids and certain organic nickel complexes are employed. However, the use of such materials as disclosed heretofore generally entails serious disadvantages including difficulties in operation due to low solubility or even insolubility of the catalysts or components thereof in the reaction medium, the high temperatures and/or pressures necessitated in their use and the relatively low yields of the desired dimers. Thus, the low or relative insolubility of the nickel salts of inorganic acids in the liquid organic diluents in the presence of which the reaction is preferably performed often renders their use impractical. The nickel salts of organic acids disclosed heretofore comprise, for example, the formate, acetate, oxalate, citrate, tartrate, succinate, and cyanide, which do not dissolve, or dissolve only very slightly, in the organic media generally employed. The nickel complexes heretofore proposed comprise, for example, the triaryl phosphine-nickel carbonyl complexes, nickel complexes with alpha-dimethylglyoxime and nitroprusside $$(Na_2[Fe(NO)(CN)_5] \cdot 2H_2O)$$

nickel complexes with aniline and with hydrazine thiocyanate. Processes disclosed heretofore relying upon the use as catalysts or components thereof of such complexes generally necessitate the use of relatively elevated pressures, often up to 1000 p.s.i.g. and higher. The yields of the desired dimers obtained therewith are generally low, particularly at low pressures desired in practical-scale operation.

A further disadvantage of processes disclosed heretofore is their inability to convert propylene to a product containing substantial amounts of 2-methylpentene-2, the dimer most readily directly pyrolyzed to isoprene without need for intermediate isomerization.

It is therefore an object of the present invention to provide an improved process enabling the more efficient catalytic dimerization of alpha-monoolefinic hydrocarbons wherein the above difficulties are obviated to at least a substantial degree.

Another object of the present invention is the provision of an improved process enabling the more efficient dimerization of alpha-monoolefins at relatively low temperatures and pressures substantially below 100 p.s.i.g. and preferably about atmospheric.

Another object of the present invention is the provision of an improved process enabling the more efficient dimerization of ethylene and/or propylene at substantially atmospheric pressure.

A particular object of the present invention is the provision of an improved process enabling the more efficient catalytic conversion of propylene to propylene dimers predominating in 2-methylpentene-2.

Other objects and advantages of the present invention will become apparent from the following detailed description thereof.

In accordance with the present invention, dimers of alpha-monoolefins are produced by contacting said alpha-monoolefins, in a liquid medium, at a temperature of from about −20 to about 40° C., in the presence of a catalyst composition consisting essentially of (a) a nickel compound, having substantial solubility in said liquid reaction medium, represented by the empirical formula:

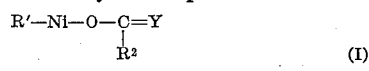

(I)

wherein

R' represents a member of the group consisting of:
  (1) an organic, preferably hydrocarbyl radical, as alkyl, cycloalkyl, alkylene, aryl, alkaryl, aralkyl, having up to 20 carbons; and
  (2)   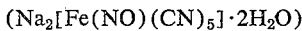

Y represents a member of the group consisting of:
  (1)     =O                                         (A)
  (2)   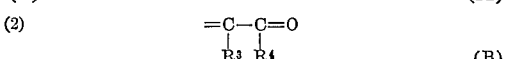   (B)
  (3)   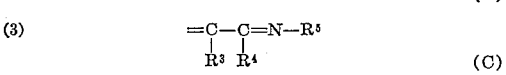   (C)

and $R^2$, $R^3$, $R^4$, and $R^5$ each are the same or a different member of the group consisting of:
  (1) H
  (2) an organic, preferably hydrocarbyl radical as alkyl, cycloalkyl, alkylene, aryl, aralkyl, alkaryl, having up to 20 carbons;

in combination with (b) an aluminum hydrocarbyl halide represented by the formula:

wherein $R^6$ represents a hydrocarbyl group having up to 12 carbons, such as alkyl, aralkyl, aryl, alkaryl, and cycloalkyl;

X represents a halogen, such as Cl, Br, I, F, preferably middle halogen; and n and m are each a number having a value above 0 and whose sum is 3.

By "substantial solubility in the liquid reaction medium" as used herein and in the appended claims is meant a solubility of at least 100 milligrams per liter of liquid reaction medium under the reaction conditions employed.

Without intent to limit in anywise the scope of the present invention by theory advanced herein to set forth more fully the nature of the invention, it is indicated that the nickel-containing components of the catalyst composition employed may be regarded as complexes wherein structure if probably characterized by nickel atoms with four ligands in square-planar configuration.

In the suitable nickel component of the catalyst composition defined by foregoing Formula I, each $R^1$, $R^2$, $R^3$, $R^4$, and $R^5$ when a hydrocarbyl group of up to twenty carbons includes: alkyl and alkylene groups of branched, straight chain, and cyclic structure, as methyl, ethyl, propyl, isopropyl, butyls, pentyls, hexyls, octyls, decyls, dodecyls, phenyl, and mono- and poly-alkyl-substituted phenyl groups wherein the alkyl substituents may be of branched or straight chain structure, as methyl, ethyl, isopropyl, n-butyl, tert.butyl, pentyls, hexyls, etc. The substituents $R^2$ and $R^3$ may constitute a part of a closed carbocyclic or heterocyclic ring structure. The suitable nickel compounds furthermore comprise those wherein one or more hydrogen atoms are substituted by inorganic substituents such as halogen, preferably middle halogen, hydroxyl, amino, imino, or mercapto groups. Compounds wherein $R^1$, $R^2$, $R^3$, $R^4$, and $R^5$ when hydrocarbyl each contain up to 12 carbons are somewhat preferred.

Preferred nickel-containing compounds within the above-defined class comprise those wherein $R^1$ in the foregoing Formula I is Y as defined above, that is the compounds represented by the formula:

(D)

wherein $R^2$ and Y have the same meaning as defined above in Formula I. Comprised in this prefered group are the compounds wherein Y is oxygen as represented by the formula:

(E)

wherein $R^2$ has the same meaning as given above in Formula I. Particularly preferred are the compounds represented for Formula E wherein $R^2$ is aryl, for example, phenyl, alkyl-substituted phenyl, or hydroxyphenyl, and more preferably a phenyl group which carries a hydroxyl group in ortho-position in relation to the carboxy group attached to nickel in addition to one or more alkyl groups. To this category belongs, for instance, the nickel salt of diisopropylsalicylic acid:

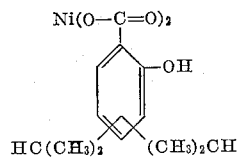

Excellent results are also obtained with the nickel compounds represented by foregoing Formula E wherein $R^2$ is a saturated, branched, aliphatic hydrocarbon radical. Examples of the later comprise the nickel salt of heptane-3-carboxylic acid, the nickel salts of higher, branched, saturated, aliphatic monocarboxylic acids, for instance those that contain more than 10 carbon atoms and in which the carboxyl groups are attached to tertiary and/or quaternary carbon atoms.

Other examples of compounds represented by foregoing Formula E are: the nickel salts of alkylbenzoic acids in which the benzene nucleus carries at least one, preferably branched, alkyl group with more than 3 carbon atoms, for instance nickel alkyl benzoates, of which the alkyl groups have been formed from propylene trimer or tetramer; also the nickel salts of higher, preferably branched, alpha-hydroxycarboxylic acids, particularly those that have more than 7 carbon atoms, such as alpha-hydroxydecanoic acids.

Comprised in the nickel-containing compounds represented by foregoing Formula D are those wherein Y is a 2-imino-alkylidene group, as represented by the formula:

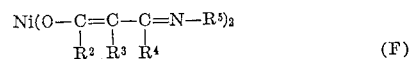

(F)

wherein $R^2$, $R^3$, $R^4$, $R^5$ have the meaning given in foregoing Formula I. These compounds characterized by the presence of an imino-alkylidene group may be regarded as nickel salts of the enol forms of the reaction products, obtained, for instance, from the corresponding 1,3-diketones, 1,3-dialdehydes or 1,3-ketoaldehydes with ammonia or with amines.

Examples of the compounds represented by foregoing Formula F comprise the nickel salts wherein $R^2$ is a furyl group, for instance the nickel salt of 1-(2-furyl)-3-imino-1-butene-1-ol:

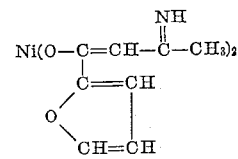

Nickel-containing compounds represented by foregoing Formula F wherein $R^2$ and $R^3$ are joined to form a closed ring (benzene structure) are exemplified by the nickel salt of N-2-propenyl salicylalimine:

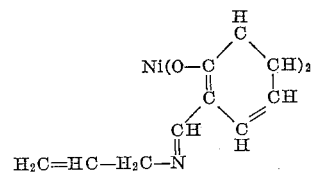

This nickel complex may be regarded as the nickel salt of an enol that is obtained by allowing salicyl aldehyde to react with alkylamine.

Excellent results are obtained in the process of the invention when using as the nickel-containing component of the catalyst composition a compound, or complex, defined by foregoing Formula D wherein Y is a 2-oxo-alkylidene group, as represented by formula:

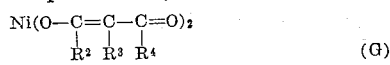

(G)

wherein each R has the meaning given above in Formula I. Of these compounds, or complexes, are somewhat preferred those wherein $R^4$ is linked to the carbonyl carbon atom through a ternary or quaternary carbon atom. Compounds of this class may be regarded as nickel salts of the enol forms of 1,3-diketones, 1,3-dialdehydes or 1,3-ketoaldehydes. Representatives of such compounds containing 2-oxo-alkylidene groups are, for instance, the nickel salt of alpha-oxymethylene pinacoline:

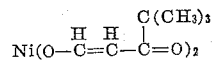

and the nickel salt of the enol form of butyryl acetophenone:

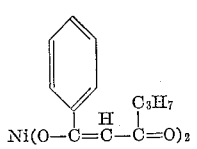

Essential to the attainment of the objects of the present invention is the use in combination of the above-defined nickel compounds, or complexes (I) with the aluminum hydrocarbyl halide. The specific combination now enables the dimerization to proceed efficiently in its presence at pressures as low as substantially atmospheric pressure.

Suitable aluminum hydrocarbyl halides employed as the aluminum-containing component of the catalyst composition are, for example, aluminumalkyl dichloride, aluminumalkyl chloride, and aluminumalkyl sesquichloride, wherein the alkyl groups have up to twelve carbons. Those wherein the alkyl group is lower alkyl, for example, up to butyl are preferred; those wherein the alkyl group is ethyl being particularly preferred.

The ratio of organic nickel compound to aluminum hydrocarbyl compound in the catalyst composition is generally so chosen that per atom of nickel there are about 2 to about 100 atoms of aluminum of the aluminum hydrocarbyl halide present. Preferably, care is taken that per atom of nickel there are about 5 to about 30 atoms of aluminum of the hydrocarbyl halide present. The nickel concentration in the organic medium is usually between 0.2 and 8 milliatoms per liter and preferably 0.3 to 3 milliatoms per liter.

The catalyst components may be introduced into the reaction zone separately or in a premixed state. The catalyst components, or mixture thereof, may be added to the hydrocarbon feed or to a separate portion of the diluent, or solvent, fed and/or to a recycle stream emanating from product and/or catalyst recovery. When the catalyst components are premixed the premixing may be carried out at ambient or elevated temperatures.

The process of the invention is applied to the alpha monoolefinic hydrocarbons broadly. Particularly suitable alpha monoolefins comprise the 1-olefins having up to eight carbons. The process is applied with particular advantage to the dimerization of ethylene, propylene, and 1-butene. A signal advantage of the present invention resides in its ability to dimerize propylene to propylene dimers predominating in 2-methylpentene-2. The charge may comprise a plurality of olefins, thereby resulting in the obtaining of products comprising codimers of olefins charged.

The process is executed in liquid phase in the presence of a substantially inert organic liquid in which the nickel-containing component of the catalyst possesses substantial solubility. Suitable solvents comprise, for example, aromatic, aliphatic, and cycloaliphatic hydrocarbons, chlorinated hydrocarbons, mixtures thereof, etc., which are in the liquid state under the reaction conditions employed. Specific examples of such suitable solvents comprise butane, pentanes, octanes, hexanes, cyclohexane, benzene, toluene, xylene, saturated hydrocarbon fractions, dioxane, and the like. The specific solvent preferably employed will be governed to some extent by the specific catalyst components used and specific olefinic charge.

An important advantage inherent in the process of the invention is the ability to carry out the dimerization reaction efficiently at substantially room temperature and at about atmospheric pressure. Generally, operation at temperatures of from about −20 to about +40° C. and particularly from about −10 to about +20° C. at a low superatmospheric pressure, for example, up to about 2 atm. is preferred. Somewhat higher or lower temperatures may, however, be used within the scope of the invention. Slightly elevated pressures, for example, up to about 10 atmospheres, though generally not advantageous may be employed within the scope of the invention. The specific temperature and pressure preferably employed will depend to some extent upon the specific reactants, catalyst components, and solvent used.

With a catalyst composition consisting essentially of the nickel salt of diisopropylsalicylic acid in combination with aluminumethyl sesquichloride, the temperature range of −10 to +10° C. marks a critical range wherein dimerization proceeds with unusually high yields (see Example II, Table II, runs 2–5 below). When using aluminumethyl dichloride as component of the catalyst composition, the critical range of temperature lies between 0 and +20° C. (see Example II, Table II, runs 10–13 below). By maintaining the concentration of the nickel catalyst component in the critical range of 1.5 to 2.0 mmoles per liter of reaction mixture unusually high yields of the desired dimers are again obtained (see Example III, Table III, runs 5–8 below).

Under the above-defined conditions, the olefin charged is converted to reaction products comprising the dimer thereof. Thus, ethylene is converted to butene, propylene to hexenes, butylene to octenes, etc. Mixed olefinic charge is converted to a product comprising codimers; thus, a charge comprising ethylene and propylene results in a reaction product comprising pentenes in addition to butylenes and hexylenes.

The dimeric product obtained will comprise various isomeric forms of the dimer. By control of reaction temperature and catalyst selection, the product distribution as well as yield is to some extent controlled.

As indicated above, a particular advantage of the present invention resides in its ability to dimerize propylene to the highly desirable 2-methylpentene-2 with unusually high yields. It has now also been found that by subjecting the reaction mixture to a digestion stage after the reaction stage, the yield of 2-methylpentene-2 is increased still further at the expense of less desirable dimer product (see Example VII, Table VII below). In one embodiment of the invention, the reaction mixture is maintained at a temperature above that used in the reaction before effecting product separation. Thus, the dimerization reaction may be executed in a first stage at a temperature of from about −10° to about +40° C. and the resulting reaction mixture heated in a second (digestion) stage maintained at a temperature which is higher than that in the reaction stage, for example, in the range of from about 20 to about 100° C.

Upon completion of the reaction, the reaction mixture is subjected to suitable product separating means comprising one or more such conventional steps as fractional cooling, condensation, fractional distillation, decantation, filtering, solvent extraction, extractive distillation, adsorption, and the like.

Unreacted olefins, solvent and/or catalyst composition or components thereof may be recycled in part or entirely to the reaction zone. Charge to the process, as well as recycle streams, may be subjected to suitable treatment to effect the removal of undesirable components therefrom.

*Example I*

Two ethene dimerizations were carried out under nitrogen and with vigorous stirring in 300 ml. of isooctane in the presence of a catalyst composition consisting of 2 mmole of nickel salt of diisopropylsalicylic acid per liter in combination with 15 mmole of aluminum sesquichloride (calculated as $Al(C_2H_5)_{1.5}Cl_{1.5}$) per liter. In one experiment the temperature was 0° C., in the other 30° C. Under these conditions each of the catalyst components in the concentration stated was completely soluble in isooctane. The rate at which the ethene was passed through was 60 liters per hour. The exit gases were conveyed to a gas condensation bottle, which was kept at −60° C. with the aid of a carbon dioxide/acetone mixture to retain the volatile dimerization products (butenes) and to separate them from the nonconverted ethene. After 1 hour the reaction was stopped by the addition of hexanol. The reaction vessel was then heated in order to convey the higher-boiling reaction products (hexenes) into the condensation bottle. The contents of the condensation bottle were then gas-chromatographically analyzed. The results are recorded in Table I.

TABLE I

| | | |
|---|---|---|
| Reaction temperature, ° C. | 0 | 30 |
| Total yield of dimerization products, g.l⁻¹.h⁻¹ | 180 | 90 |
| Composition of reaction product, percent w.: | | |
| Butene-1 | 5.8 | 10.8 |
| Butene-2-cis | 20.3 | 20.1 |
| Butene-2-trans | 53.2 | 52.5 |
| Hexenes | 20.7 | 16.6 |

Example II

A series of propene dimerizations were carried out under nitrogen and with vigorous stirring in 300 ml. of isooctane in the presence of a catalyst composition consisting of 2 mmole of nickel salt of diisopropylsalicylic acid per liter in combination with 15 mmole of an aluminum-alkyl halide compound per liter defined in Table II. Propene was passed through at a rate of 60 liters per hour. The exit gases were passed through a vertical cooling device, where they were cooled to −30° C. Reaction conditions are given in the following table, Table II.

After 1 hour the reaction was stopped by the addition of ethanol. Ethanol and catalyst components were then washed from the reaction product with a saturated $Na_2SO_4$ solution. The contents of the reaction vessel were then dried with anhydrous magnesium sulfate and analyzed by gas chromatography. The results are summarized in Table II.

Example III

A series of propene dimerizations were carried out for 1 hour at 10° C. in isooctane with a catalyst combination consisting of nickel diisopropyl salicylate (ni-DIPS) in combination with aluminumethyl dichloride. Other conditions are listed in following Table III. For the rest the experiments were carried out in the same way as described in foregoing Example II. Results are given in Table III.

Example IV

A series of propene dimerizations were performed, each experiment being carried out with a different nickel-containing catalyst component. The concentration of the nickel component was invariably 2 mmole per liter. As metal hydrocarbyl halide in combination therewith $$Al(C_2H_5)Cl_2$$

was used in a concentration of 15 mmole per liter in all experiments. Other conditions are recorded in following Table IV. For the rest, the experiments were carried out in the same way as described in foregoing Example II. Results obtained are recorded in Table IV. For comparison, data are also given for experiments employing two nickel compounds which though soluble in the reaction medium, are not comprised in catalyst components used in the process of the invention. The nickel compounds, in the concentrations reported, were completely soluble in the reaction medium employed.

TABLE II

| Al Component | $Al(C_2H_5)1.5Cl_{1.5}$ | | | | | | | $Al(C_2H_5)Cl_2$ | | | | | | | |
|---|---|---|---|---|---|---|---|---|---|---|---|---|---|---|---|
| Experiment No. | 1 | 2 | 3 | 4 | 5 | 6 | 7 | 8 | 9 | 10 | 11 | 12 | 13 | 14 | 15 |
| Temperature, °C | 20 | −10 | −5 | 0 | +10 | +20 | +30 | −20 | −5 | 0 | +5 | +10 | +20 | +30 | +40 |
| Yield, g.l⁻¹.h⁻¹ | 198 | 424 | 395 | 437 | 301 | 213 | 59 | 19 | 89 | 494 | 437 | 538 | 390 | 248 | 143 |

COMPOSITION OF REACTION PRODUCT, PERCENT W.

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Hexene-2 cis | 4.3 | 4.4 | 2.3 | 2.8 | 5.0 | 3.8 | 4.0 | 5.3 | 4.0 | 4.0 | 4.8 | 4.0 | 3.3 | 3.3 | 4.2 |
| Hexene-3 trans+Hexene-1 | 2.3 | 7.3 | 6.1 | 5.0 | 5.4 | 5.8 | 5.5 | 0 | 4.8 | 5.1 | 4.7 | 5.9 | 4.2 | 4.2 | +.9 |
| Hexene-3 cis | 0 | 0 | 0 | 0 | 0 | 0 | 1.1 | 0 | 0 | 0 | 0 | 0 | 0 | 0 | 0 |
| Pentene-1 | 1.4 | 0.8 | 0.8 | 0.7 | 0 | 0 | 0 | 0 | 0 | 0 | 0 | 0 | 0 | 0 | 0 |
| 2,3-dimethylbutene-1 | 4.3 | 6.3 | 6.1 | 3.9 | 0 | 0 | 1.7 | 0 | 0 | 8.3 | 4.7 | 4.9 | 3.8 | 0 | 0 |
| 2,3-dimethylbutene-2 | 0 | 0.5 | 1.2 | 1.3 | 3.8 | 4.1 | 3.7 | 0 | 0 | 0.8 | 0.5 | 2.8 | 4.3 | 5.0 | 5.3 |
| 2-methylpentene-1 | } 7.6 | 19.1 | 17.5 | 18.2 | 19.8 | 22.5 | 24.0 | 17.1 | 20.4 | 19.2 | 18.6 | 19.3 | 17.2 | 20.0 | 22.7 |
| Hexene-2 trans | | | | | | | | | | | | | | | |
| 3-methylpentene-1 | } 3.2 | 1.3 | 1.5 | 0.9 | 0.8 | 0 | 0.7 | 14.4 | 5.9 | 1.8 | 1.7 | 1.2 | 0.8 | 0 | 0.5 |
| 4-methylpentene-1 | 10.0 | 17.1 | 23.1 | 29.5 | 49.1 | 51.8 | 43.2 | 7.9 | 10.5 | 20.1 | 24.6 | 29.8 | 42.0 | 52.1 | 52.6 |
| 2-methylpentene-2 | 6.6 | 4.6 | 5.0 | 3.2 | 2.1 | 1.7 | 2.1 | 5.3 | 7.0 | 4.4 | 5.1 | 3.7 | 2.8 | 1.8 | 1.4 |
| 4-methylpentene-2 cis | 50.3 | 38.6 | 36.4 | 34.5 | 14.0 | 10.3 | 14.0 | 50.0 | 47.4 | 36.3 | 35.3 | 28.4 | 21.6 | 13.6 | 10.4 |
| 4-methylpentene-2 trans | | | | | | | | | | | | | | | |

TABLE III

| | Experiment No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Reaction Volume, ml | 150 | 150 | 150 | 150 | 300 | 150 | 150 | 150 | 300 | 300 | 300 | 300 |
| Ni-DIPS mmole/liter | 5 | 3 | 2.5 | 2.25 | 2 | 2 | 1.75 | 1.5 | 1 | 0.5 | 0.2 | 1 |
| $Al(C_2H_5)Cl_2$ mmole/liter | 15 | 15 | 15 | 15 | 15 | 15 | 15 | 15 | 15 | 15 | 15 | 7.5 |
| Yield, g.l⁻¹.h⁻¹ | 27 | 198 | 252 | 170 | 538 | 539 | 603 | 336 | 92 | 38 | 6 | 140 |

COMPOSITION OF THE REACTION PRODUCT, PERCENT W.

| | 1 | 2 | 3 | 4 | 5 | 6 | 7 | 8 | 9 | 10 | 11 | 12 |
|---|---|---|---|---|---|---|---|---|---|---|---|---|
| Hexene-2 cis | | 3.6 | 4.4 | 4.5 | 4 | 2.7 | 2.4 | 3.8 | 1.1 | 0.8 | | 1 |
| Hexene-3 cis | | 0 | 0.6 | 0 | 0 | 0.7 | 0.6 | 0.5 | 0 | 0 | | 1 |
| Hexene-3-trans and hexene-1 | | 4.9 | 4.7 | 6.9 | 5.9 | 3.7 | 4 | 4.5 | 2.9 | 0.8 | | 1.9 |
| 2,3-dimethylbutene-1 | | 0 | 0 | 0 | 4.9 | 3.7 | 0 | 0 | 0 | 0 | | 0 |
| 2,3-dimethylbutene-2 | (1) | 1 | 0.6 | 0.4 | 2.8 | 2.1 | 1.5 | 4.7 | 0.7 | 0.8 | (1) | 0.5 |
| 2-methylpentene-1 and hexene-2 trans | | 20.7 | 19.4 | 16.3 | 19.3 | 15.9 | 15.8 | 17.2 | 20.7 | 19.8 | | 16.4 |
| 3-methylpentene-1 and 4-methylpentene-1 | | 2.6 | 2.1 | 2.7 | 1.2 | 0.9 | 0.9 | 1 | 1.8 | 2.4 | | 1.4 |
| 2-methylpentene-2 | | 12 | 16.4 | 15.6 | 29.8 | 26.6 | 30.1 | 31.7 | 27.4 | 18.3 | | 27.4 |
| 4-methylpentene-2 cis | | 7.2 | 6.4 | 6.5 | 3.7 | 4.2 | 3.4 | 4 | 4.7 | 6.4 | | 5.8 |
| 4-methylpentene-2 trans | | 48.0 | 45.4 | 47.1 | 28.4 | 32.6 | 30.6 | 32.6 | 40.7 | 50.7 | | 44.6 |
| Olefins with more than 6 C-atoms | | 0 | 0 | 0 | 0 | 6.9 | 10.7 | 0 | 0 | 0 | | 0 |

[1] Reaction product not analyzed in view of low yield.

TABLE IV

| | Experiment No. | | | | | | | | |
|---|---|---|---|---|---|---|---|---|---|
| | 1 | 2 | 3 | 4 | 5 | 6 | 7 | 8 | 9 |
| Organic medium | Iso-octane | | | Benzene | | | Iso-octane | | Benzene |
| Reaction Volume, ml | 300 | 150 | 150 | 150 | 150 | 150 | 150 | 300 | 150 |
| Reaction Temperature, °C | 10 | 10 | 10 | 10 | 10 | 10 | 10 | 0 | 5 |
| Ni-compound | (1) | (2) | (3) | (4) | (5) | (6) | (7) | (8) | |
| Yield, g.⁻¹.h⁻¹ | 444 | 150 | 245 | 563 | 436 | 134 | <4 | 9 | 6 |

COMPOSITION OF THE REACTION PRODUCTION, PERCENT W.

| | 1 | 2 | 3 | 4 | 5 | 6 | 7, 8, 9 |
|---|---|---|---|---|---|---|---|
| Hexene-1 } Hexene-3 trans | 5 | 3.2 | 0.9 | 4.0 | 4.3 | 5.5 | Not analyzed in view of low yield. |
| Hexene-3 cis | 0 | 0 | 4.7 | 1.5 | 0.9 | 0.6 | |
| Hexene-2 cis | 3.6 | 2.8 | 3.7 | 4.6 | 3.0 | 3.1 | |
| Hexene-2 trans } 2-methylpentene-1 | 12.3 | 19.9 | 19.3 | 17.4 | 17.9 | 20.3 | |
| 3-methylpentene-1 } 4-methylpentene-1 | 1.8 | 1.2 | 0.8 | 0.8 | 0.2 | 0 | |
| 2,3-dimethylbutene-1 | 5.7 | 0 | 3.7 | 1.3 | 1.8 | 0 | |
| 2,3-dimethylbutene-2 | 2.7 | 0.8 | 4.2 | 3.6 | 4.6 | 2.4 | |
| 2-methylpentene-2 | 25.7 | 23.5 | 48.5 | 46.8 | 55.7 | 56.5 | |
| 4-methylpentene-2 trans | 37.7 | 43.3 | 11.9 | 17.2 } 2.8 | 11.6 | 10.4 | |
| 4-methylpentene-2 cis | 5.5 | 5.3 | 2.3 | | | 1.2 | |

¹ Ni-salt of a C₁₇ acid branched at the alpha-position.
² Ni-salt of heptane-3-carboxylic acid.
³ Ni-salt of alpha-oxy-methylene pinacoline.
⁴ Ni-salt of enol of butyryl acetophenone.
⁵ Ni-salt of N-2-propenyl salicylalimine.
⁶ Ni-salt of 1(2-furyl)-3-imino-1-butene-1-ol.
⁷ Ni-complex of n-heptane 2,3-dioxime.
⁸ Triphenyl phosphine Ni carbonyl complex.

Example V

Propene was dimerized in a continuous operation at elevated pressure and at a residence time of 1 hour, in isooctane at 30° C. in the presence of 1 mmole of nickel diisopropyl salicylate per liter in combination with 7.5 mmole of aluminumethyl dichloride per liter. The velocities at which the propene was passed in and the exit gases removed were so regulated that the pressure in the reaction zone was constant at 3 ata. The quantity and composition of the reaction products obtained during the first hour, as well as of those produced during the fourth hour of the dimerization are reported in the following Table V.

Example VI

A series of experiments were carried out in which a mixture of ethene and propene was subjected to a codimerization in isooctane. The reaction time in each experiment was 1 hour. The nickel component of the catalyst composition used was diisopropylsalicylic acid (Ni-DIPS). The metal hydrocarbyl halide and the ethene/propene ratio in the feed were varied as indicated in following Table VI. Also given in Table VI are the reaction volume, the concentration of catalyst components and the reaction temperaturme. The feed was passed through at a rate of 80 liters per hour. The reaction products were worked up in the same way as is described in foregoing Example I. The results are recorded in the following Table VI.

TABLE VI

| | Experiment No. | | | | | | |
|---|---|---|---|---|---|---|---|
| | 1 | 2 | 3 | 4 | 5 | 6 | 7 |
| Reaction Volume, ml | 150 | 150 | 150 | 150 | 150 | 150 | 300 |
| Reaction temperature, °C | 10 | 10 | 10 | 10 | 10 | 10 | 0 |
| Molar ratio of ethene/propene in feed | 3/1 | 1/1 | 1/3 | 3/1 | 1/1 | 1/3 | 1/1 |
| Concentration of Ni-DIPS, mmole/liter | 1.75 | 1.75 | 1.75 | 1.75 | 1.75 | 1.75 | 2 |
| Nature and concentration (mmole/liter) of metal hydrocarbyl halide | Al(C₂H₅)Cl₂ 15 | | | Al(C₂H₅)₁.₅Cl₁.₅ 15 | | | Al(C₂H₅)₂Cl 15 |
| Yield, g.l.⁻¹h.⁻¹ | 600 | 420 | 400 | 378 | 224 | 270 | 168 |

COMPOSITION OF THE REACTION PRODUCT, PERCENT W.

| | 1 | 2 | 3 | 4 | 5 | 6 | 7 |
|---|---|---|---|---|---|---|---|
| Butenes | 56.4 | 28.7 | 7.1 | 60.3 | 31.2 | 10.5 | 31.5 |
| Pentenes | 17.2 | 38.1 | 28.1 | 25.1 | 35.9 | 38.7 | 43.8 |
| Hexenes | 22.3 | 33.2 | 63.2 | 13.3 | 30.9 | 49.3 | 10.7 |
| Higher olefins | 4.1 | 0 | 1.7 | 1.3 | 2.0 | 1.5 | 14.0 |

TABLE V.—COMPOSITION OF THE REACTION PRODUCT, PERCENT W.

| Yield, g.l.⁻¹ h.⁻¹ | First hour of Reaction, 130 | Fourth Hour of Reaction, 128 |
|---|---|---|
| Hexene-1 } Hexene-3-trans | 5.5 | 5.9 |
| Hexene-3-cis | 1.1 | 0.9 |
| Hexene-2-cis | 5.5 | 5.5 |
| Hexene-2 trans } 2-methylpentene-1 | 18.7 | 19.5 |
| 3-methylpentene-1 } 4-methylpentene-1 | 2.7 | 2.3 |
| 2,3-dimethylbutene-2 | 3.3 | 1.8 |
| 2-methylpentene-2 | 23.1 | 25.5 |
| 4-methylpentene-2 trans | 34.6 | 33.6 |
| 4-methylpentene-2 cis | 5.5 | 5.0 |

Example VII

In a plurality of operations propylene was dimerized in an organic solvent containing a catalyst composition consisting of 2 mmole of nickel diisopropyl salicylate and 15 mmole of aluminumethyl dichloride per liter of reaction mixture, at 10° C., in a first (reaction) stage. The resulting reaction mixture was thereupon heated in quiescent state for a period at a higher temperature in a second (digestion) stage. Organic solvent and digestion time and digestion temperature are included in the following Table VII. Also given in Table VII are the results obtained in terms of product composition. Included in Table VII are data obtained in runs executed without digestion stage.

TABLE VII.—INFLUENCE OF DIGESTION TEMPERATURE BEFORE CATALYST DESTRUCTION ON PRODUCT COMPOSITION

Catalyst: 2 mmole/l Ni DIPS and 15 mmole/l AlEtCl₂
Reaction temperature: 10° C.

| Solvent | Isooctane | | | Benzene | |
|---|---|---|---|---|---|
| Digestion temperature, ° C | | 40 | 78 | | 40 |
| Digestion time, min | (¹) | 30 | 30 | (²) | 15 |
| Composition of reaction product, percent w. | | | | | |
| Hexene-1 and hexene-3-trans | 3.4 | 5.5 | 4.9 | 3.9 | 5.4 |
| Hexene-3-cis | 0.8 | 1.0 | 1.2 | 0.8 | 1.1 |
| Hexene-2-cis | 1.4 | 3.3 | 1.5 | 3.1 | 3.2 |
| Hexene-2-trans and 2-Methylpentene-1 | 16.6 | 18.5 | 19.8 | 15.1 | 18.6 |
| 3- and 4-methylpentene-1 | 1.0 | 0.3 | 0.8 | 0.5 | 0.5 |
| 2,3-Dimethylbutene-1 | 2.7 | 4.5 | 4.3 | 3.1 | 3.7 |
| 2,3-Dimethylbutene-2 | 38.5 | 48.7 | 49.3 | 28.0 | 46.3 |
| 2-Methylpentene-2 | 26.2 | 10.1 | 10.8 | 40.4 | 19.1 |
| 4-Methylpentene-2-trans | 3.8 | 1.4 | 1.6 | 5.1 | 2.1 |
| 4-Methylpentene-2-cis | 5.6 | 6.7 | 5.8 | | |
| Higher olefins | | | | | |

¹ Original sample dimerized for 2 hours.
² Original sample dimerized for 1 hour.

We claim as our invention:

1. The process for converting an alpha-monoolefinic hydrocarbon to a reaction product consisting essentially of dimers of said olefinic hydrocarbon which consists of contacting said olefinic hydrocarbon in liquid phase at a temperature of from about −20 to about +40° C. in a hydrocarbon solvent, with a catalyst composition consisting essentially of a nickel-complex having the formula:

wherein $$Ni(-O-C=Y)_2$$
$$\phantom{Ni(-O-}R^2$$

Y is a member of the group consisting of
  (1) =O
  (2) =C−C=O
       $\phantom{=}R^3\phantom{-}R^4$
  and
  (3) =C−C=N−R⁵
       $\phantom{=}R^3\phantom{-}R^4$
  and R², R³, R⁴, and R⁵ each represent a member of the group consisting of:
  (1) H
  (2) hydrocarbyl group having up to 20 carbons;
in combination with an aluminumhydrocarbyl halide, said catalyst composition containing from about 2 to about 100 atoms of aluminum per atom of nickel, and the reaction mixture contains from about 0.2 to about 8 milliatoms of nickel per liter.

2. The process in accordance with claim 1 wherein said olefinic hydrocarbon is propylene.

3. The process for converting an alpha-monoolefinic hydrocarbon having up to eight carbon atoms to the molecule to a reaction product consisting essentially of dimers of said olefinic hydrocarbon which consists of contacting said olefinic hydrocarbon in liquid phase, at a temperature of from about −20 to about 40° C., in a hydrocarbon solvent, with a catalyst composition consisting essentially of nickel compound of the formula wherein $$Ni(-O-C=Y)_2$$
$$\phantom{Ni(-O-}R_2$$

Y is a member of the group consisting of
  (1) =O
  (2) =C−C=O
       $\phantom{=}R^3\phantom{-}R^4$
  and
  (3) =C−C=N−R⁵
       $\phantom{=}R^3\phantom{-}R^4$
  and R², R³, R⁴, and R⁵ each represent a member of the group consisting of
  (1) H and
  (2) hydrocarbyl groups having up to 20 carbon atoms;
in combination with an aluminumalkyl chloride wherein the alkyl constituent contains up to 12 carbons, said catalyst composition containing from about 2 to about 100 atoms of aluminum per atom of nickel, and the reaction mixture contains from about 0.2 to about 8 milliatoms of nickel per liter.

4. The process in accordance with claim 3 wherein said nickel compound is a compound of the formula $$Ni(-O-C=O)_2$$
$$\phantom{Ni(-O-}R^2$$

wherein R² is a member of the group consisting of hydrogen and alkyl groups having up to 20 carbon atoms.

5. The process in accordance with claim 4 wherein said nickel compound is the nickel salt of diisopropylsalicylic acid.

6. The process in accordance with claim 4 wherein said nickel compound is the nickel salt of alkyl-substituted benzoic acid.

7. The process for converting an alpha-monoolefinic hydrocarbon having up to eight carbon atoms to the molecule to a reaction product consisting essentially of dimers of said olefinic hydrocarbon, which consists of contacting said olefinic hydrocarbon in liquid phase, at a temperature of from about −20 to about 40° C. in a hydrocarbon solvent, with a catalyst composition consisting essentially of a nickel compound of the formula:

$$Ni(-O-C=C-C=N-R^5)_2$$
$$\phantom{Ni(-O-}R^2\phantom{-}R^3\phantom{-}R^4$$

wherein R², R³, R⁴, and R⁵ each represent a member of the group consisting of hydrogen and hydrocarbyl groups having up to 20 carbon atoms in combination with an aluminumalkyl chloride wherein the alkyl constituent contains up to 12 carbons, said catalyst composition containing from about 2 to about 100 atoms of aluminum per atom of nickel, and the reaction mixture contains from about 0.2 to about 8 milliatoms of nickel per liter.

8. The process in accordance with claim 7 wherein said nickel compound is the nickel salt of N-2-propenyl salicylalimine.

9. The process in accordance with claim 7 wherein said nickel compound is the nickel salt of 1-(2-furyl)-3-imino-1-butene-1-ol.

10. The process for converting an alpha-monoolefinic hydrocarbon having up to eight carbon atoms to the molecule to a reaction product consisting essentially of dimers of said olefinic hydrocarbon, which consists of contacting said olefinic hydrocarbon in liquid phase, at a temperature of from about −20 to about 40° C., in a hydrocarbon solvent, with a catalyst composition consisting essentially of a nickel compound of the formula $$Ni(-O-\underset{R^2}{C}=\underset{R^3}{C}-\underset{R^4}{C}=O)_2$$

wherein $R^2$, $R^3$, and $R^4$ each represent a member of the group consisting of hydrogen and hydrocarbyl groups having up to 20 carbon atoms in combination with an aluminumalkyl chloride wherein the alkyl constituent contains up to 12 carbons, said catalyst composition containing from about 2 to about 100 atoms of aluminum per atom of nickel, and the reaction mixture contains from about 0.2 to about 8 milliatoms of nickel per liter.

11. The process in accordance with claim 10 wherein said nickel compound is the nickel salt of alpha-oxymethylene pinacoline.

12. The process in accordance with claim 10 wherein said nickel compound is the nickel salt of butyryl acetophenone.

13. The process for the production of propylene dimer which consists of contacting propylene, in liquid phase, at a temperature of from about −20 to about 40° C., in a hydrocarbon solvent, with a catalyst composition consisting essentially of the nickel salt of diisopropylsalicylic acid in combination with aluminumalkyl chloride wherein said alkyl constituent contains up to twelve carbon atoms, said catalyst composition containing from about 2 to about 100 atoms of aluminum per atom of nickel, and the reaction mixture contains from about 0.2 to about 8 milliatoms of nickel per liter.

14. The process for the production of propylene dimer predominating in 2-methylpentene-2 which comprises contacting propylene at a temperature of from about −20 to about 40° C., with a liquid reaction medium consisting essentially of a hydrocarbon solvent and an amount of catalyst composition consisting essentially of nickel salt of diisopropylsalicyclic acid in combination with aluminumethyl chloride to result in a nickel concentration of from about 0.2 to about 8 milliatoms per liter of said reaction medium, said catalyst composition containing from about 2 to about 100 atoms of aluminum per atom of nickel.

15. The process for the production of propylene dimer predominating in 2-methylpentene-2, which comprises contacting propylene at a temperature of from about −10 to about +10° C., with a liquid reaction medium consisting essentially of a hydrocarbon solvent solution of a catalyst composition consisting essentially of nickel salt of diisopropylsalicyclic acid in combination with aluminumethyl sesquichloride, said catalyst combination containing from about 2 to about 100 atoms of aluminum per atom of nickel, and said reaction medium containing from about 1.5 to about 2 mmoles of said nickel salt of diisopropylsalicyclic acid per liter.

16. The process for the production of propylene dimer predominating in 2-methylpentene-2, which comprises contacting propylene at a temperature of from about 0 to about 20° C., with a liquid reaction medium consisting essentially of a hydrocarbon solvent solution of a catalyst composition consisting essentially of nickel salt of diisopropylsalicyclic acid in combination with aluminumethyl dichloride, said catalyst combination containing from about 2 to about 100 atoms of aluminum per atom of nickel, and said reaction medium containing from about 1.5 to about 2 mmoles of said nickel salt of diisopropylsalicylic acid per liter.

17. The process for the production of 2-methylpentene-2, which comprises contacting propylene in a first stage, at a temperature of from about −20 to about 40° C., with a liquid reaction medium consisting essentially of a solution of a catalyst combination consisting essentially of nickel diisopropylsalicylic acid in combination with aluminumalkyl chloride in a hydrocarbon solvent, said catalyst combination containing from about 2 to about 100 atoms of aluminum per atom of nickel and the reaction mixture contains from about 0.2 to about 8 milliatoms of nickel per liter, thereafter heating the resulting reaction mixture, in a second stage, at a temperature in the range of from about +20 to about +100° C. which is higher than the temperature in said first stage, and separating 2-methylpentene-2 from the reaction products obtained in said second stage.

References Cited by the Examiner

UNITED STATES PATENTS

| | | | |
|---|---|---|---|
| 2,781,410 | 2/1957 | Ziegler et al. | 260—683.15 |
| 2,978,523 | 4/1961 | Coyne et al. | 260—683.15 |
| 3,035,104 | 5/1962 | Harvey et al. | 260—683.15 |
| 3,096,385 | 7/1963 | McConnell | 260—683.15 |

DELBERT E. GANTZ, *Primary Examiner.*

R. H. SHUBERT, *Assistant Examiner.*